United States Patent
Kensok et al.

(10) Patent No.: US 6,220,039 B1
(45) Date of Patent: Apr. 24, 2001

(54) METHOD OF HUMIDITY CONTROL UTILIZING DEWPOINT

(75) Inventors: Timothy J. Kensok, Minnetonka; Jeffrey R. Meyer, Minneapolis, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/094,853

(22) Filed: Jun. 15, 1998

(51) Int. Cl.[7] ................ F25D 17/06; F24F 3/14
(52) U.S. Cl. .............. 62/93; 62/176.6; 236/44 R; 126/113
(58) Field of Search ................... 62/90, 91, 93, 62/176.1, 176.4, 176.6; 236/44 A, 44 R; 126/113

(56) References Cited

U.S. PATENT DOCUMENTS

| | | | |
|---|---|---|---|
| 3,965,690 | 6/1976 | Berryhill | 62/121 |
| 5,309,725 | 5/1994 | Cayce | 62/90 |
| 5,469,707 | 11/1995 | Dadachanji | 62/93 X |
| 5,752,389 | 5/1998 | Harper | 62/176.5 |

Primary Examiner—William Wayner
(74) Attorney, Agent, or Firm—Robert B. Leonard

(57) ABSTRACT

A method of controlling humidity within a space, where the space communicates with humidity control equipment. The method comprises determining a dew-point temperature within the space, and comparing the dew-point temperature to a predetermined desired dew-point temperature. The humidity control equipment is then controlled based upon the difference between the dew-point temperature and the predetermined desired dew-point temperature. The humidity control equipment can be a humidifier, and the dew-point temperature can be determined by sensing the temperature and humidity within the space, or by sensing the temperature and humidity within a duct, such as a return air duct.

7 Claims, 3 Drawing Sheets

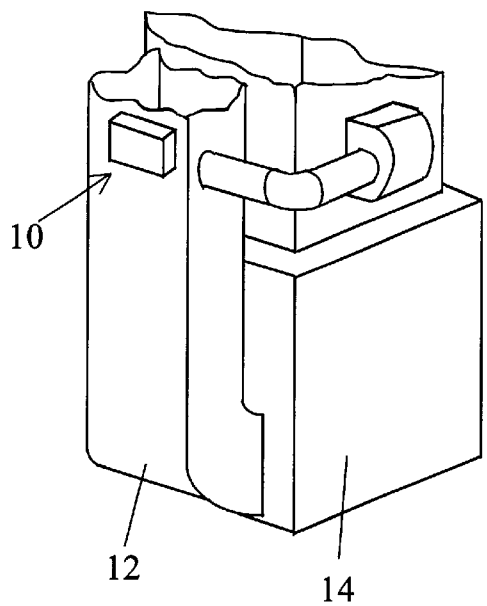
FIGURE 1-
PRIOR ART
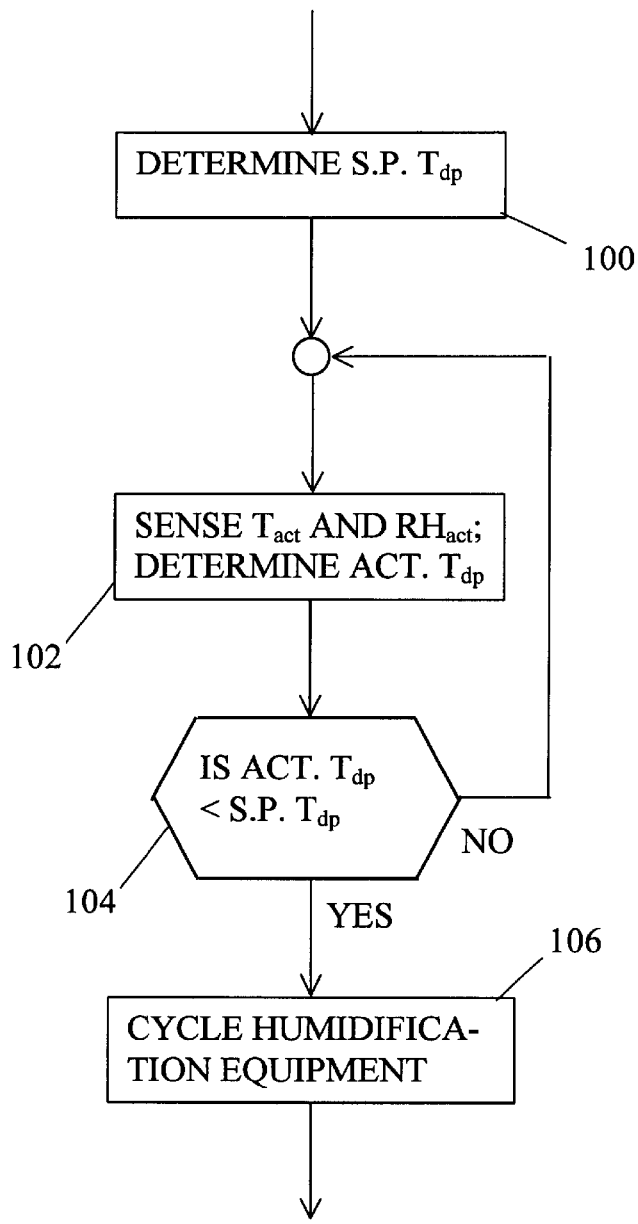
FIGURE 3

METHOD OF HUMIDITY CONTROL UTILIZING DEWPOINT

FIELD OF THE INVENTION

This invention relates to humidity control within an enclosed environment, such as homes and offices. More particularly, this invention relates to a method of controlling humidity within an enclosed environment utilizing dewpoint to control humidity control equipment and thereby change the humidity within the enclosed environment.

BACKGROUND OF THE INVENTION

As shown in FIG. 1, a common approach to humidity control in homes and buildings in many parts of the country, such as in the Midwestern United States, is to mount a humidistat 10 on a return air duct 12 at the furnace 14. This is done, in many instances, in order to simplify the installation of the humidity control equipment. A humidistat is a conventional device that measures humidity and which controls humidification equipment associated with the home or building.

It has been previously thought that a duct mounted sensor provides a good average measure of the relative humidity level in the home or building. However, in many instances the temperature and the relative humidity percentage (%RH) in the duct is different from the temperature and %RH in the living/working space(s) of the home/building. The humidity sensor, which may be a nylon element or electronic sensor, associated with the humidistat, senses the %RH of the air in the duct at the temperature in the duct. This will cause an error in the control point if the temperature and humidity in the living/working space is different from that in the duct.

For example, if the temperature in the living/working space is 72° F. and the furnace is located in an unfinished basement, which is generally cooler that the rest of the building, it would not be uncommon for the temperature in the duct to be substantially lower than the temperature in the living/working space, such as 65° F. or lower. Thus, if the control is set to 40% RH, the actual humidity level in the living/working space would only be 31%.

Further, the periodic cycling of the circulation fan associated with the furnace causes temperature and humidity fluctuations within the duct. During periods when the fan is not running and the air is not moving through the return air duct, it would not be uncommon for the temperature in the duct to be five to ten degrees higher or lower that the temperature in the living space. This temperature difference would change the relative humidity by as much as 16%RH. Thus, a humidity control relying upon the sensing of temperature or humidity within the duct would be inaccurate due to the variation of temperature and humidity within the duct due to fan cycling.

In addition, during periods when the thermostat of the space is set back a large amount, for instance from about 72° F. to about 60° F., the humidity level within the space will not be adequately controlled to achieve a comfortable level for the set temperature.

Although the %RH and temperature may temporarily fluctuate, the dew-point temperature, which is a function of %RH and temperature, remains relatively constant. Thus, the dew-point temperature within the living/working space would be generally equal to the dew-point temperature within the return air duct, regardless of the temperature and humidity differences between the two locations. Therefore, it would be desirable to be able to control humidification equipment based upon dew-point temperature, thereby providing more accurate control of the humidification equipment and reduce unnecessary operation thereof.

SUMMARY OF THE INVENTION

It is therefore an object of the present invention to provide a method of controlling the humidity level within an enclosed space based upon the actual dew-point temperature and a desired dew-point temperature within the enclosed space.

It is another object of the present invention to provide a method of controlling the humidity level within an enclosed space which eliminates control errors and unnecessary operation of humidity control equipment due to temperature differences and temperature fluctuations, as well as allowing for increased flexibility in designing the humidity control system.

These and other objects are achieved by the present invention which provides a method of controlling humidity within a space, where the space communicates with humidity control equipment. The method comprises determining a dew-point temperature within the space, and comparing the dew-point temperature to a predetermined desired dew-point temperature. The humidity control equipment is then controlled based upon the difference between the dew-point temperature and the predetermined desired dew-point temperature.

The humidity control equipment preferably comprises humidification equipment, which is cycled when the dew-point temperature is less than the predetermined desired dew-point temperature.

Further, the dew-point temperature can be determined by sensing the temperature and humidity within the space, or sensing the temperature and humidity within a duct, such as a return air duct. Further, the dew-point temperature can be determined by sensing the temperature and humidity, either in the space or in the duct, after a predetermined amount of cycle time of a circulation fan has elapsed.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

FIG. 1 illustrates a conventional humidification approach in which a humidistat is mounted on a return air duct.

FIG. 3 is a flow diagram of the steps for controlling humidity in accordance with the invention.

DETAILED DESCRIPTION OF THE PREFERRED EMBODIMENT

Figure 2:
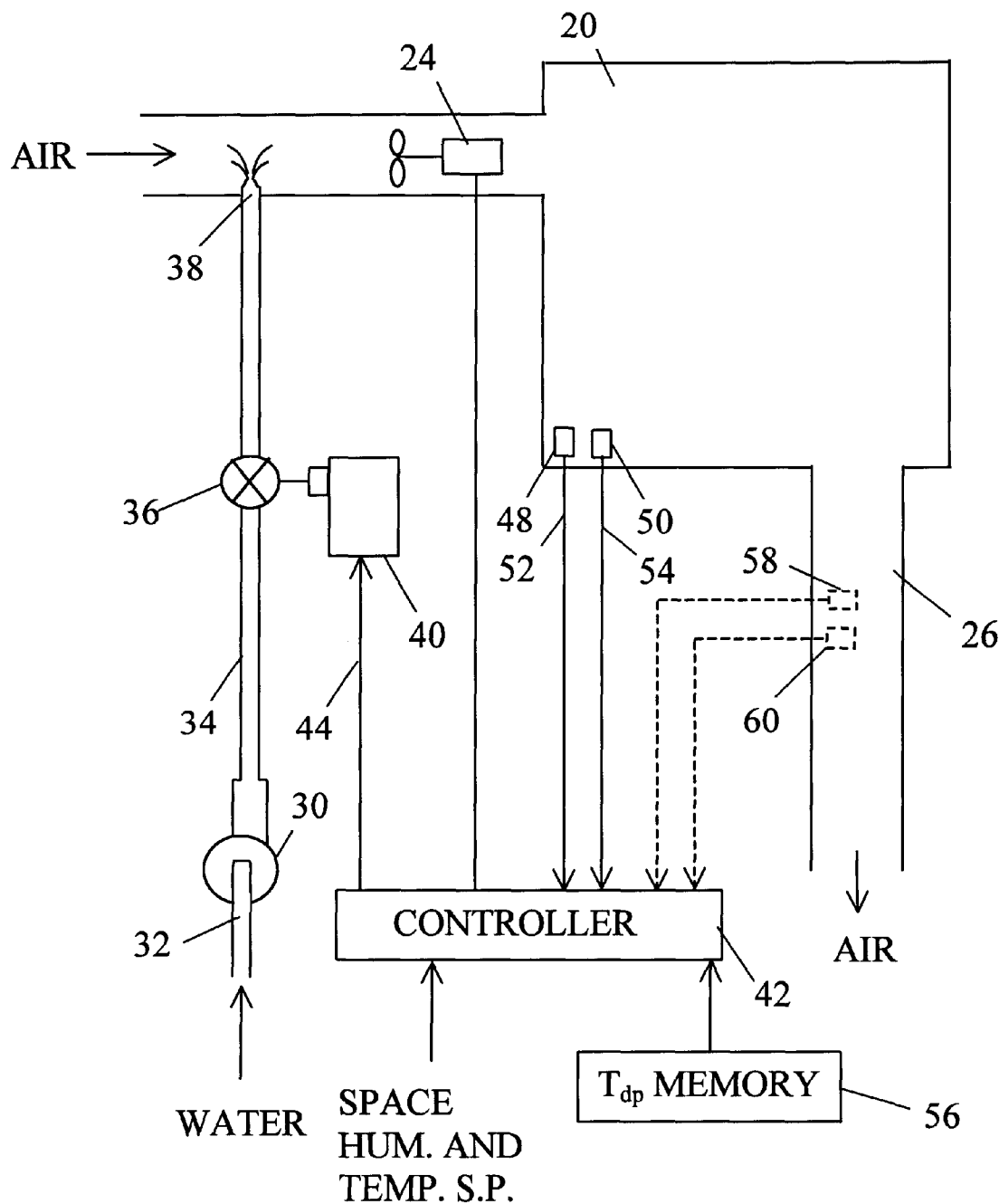
FIG. 2 illustrates the arrangement for controlling humidity in accordance with the invention.

The method of the invention is intended to control the humidity of an enclosed space 20 which receives conditioned air from an inlet duct 22 that communicates with a furnace. Air is drawn through the duct 22 and forced into the space 20 by a motor driven fan 24, with air being allowed to escape from the space 20 and return to the furnace through a return air duct 26. The space 20 is typically a room within a building, such as a home or office, in which the humidity level is controlled to provide comfort for occupants of the room.

The humidity in the space 20 is affected by the humidity of the air entering the space 20 from the duct 22. Humidification equipment 28 communicates with the duct 22 in order to affect the humidity of the air that enters the space 20. The humidification equipment 28 includes a pump 30 that receives water from a water supply line 32 and provides pressurized water through a pipe 34 to an adjustable valve 36. Water flows from the valve 36 to a nozzle 38 which sprays water into the air stream of the duct 22 in a fine mist, raising the humidity level thereof An actuator 40 controls the setting of the valve 36 and therefore the rate at which water flows through the valve 36 from the pump 30. While a particular form of humidification equipment has been illustrated and described, it is to be realized that other forms of humidification equipment could be used if desired.

In the preferred embodiment of the invention, the actuator 40 is controlled by a controller 42 via a signal 44 provided by the controller 42. The controller 42 controls the opening degree of the valve 36 to thereby control the amount of water added into the duct 22 to achieve a desired humidity level, as well as closing the valve when the humidity in the space 20 does not need to be adjusted. The controller 42 is provided with a series of inputs related to the desired conditions within the space 20 as well as the actual conditions within the space 20, and then uses this information to control the humidification equipment 28 so that the actual conditions approximate the desired conditions.

In particular, humidity and temperature set points 46, indicative of the predetermined desired humidity and temperature levels within the space 20, are input into the controller 42. Further, a humidity sensor 48 and a temperature sensor 50 within the space 20 measure the actual humidity and temperature in the space 20, and provide actual humidity and temperature input signals through lines 52, 54, respectively, to the controller 42.

FIG. 3 illustrates the steps performed within the controller 42 to determine the need for humidification within the space 20. In particular, the controller 42 determines a set point dew-point temperature, S.P. $T_{dp}$, at step 100, based on the set point humidity and temperature levels 46. At step 102, the actual humidity and temperature in the space 20, $RH_{act}$ and $T_{act}$, are sensed and input into the controller, and the controller then determines the actual dew-point temperature, Act. $T_{dp}$, based on the actual humidity and temperature in the space.

The actual dew-point temperature determined by the controller 42 is then compared to the set point dew-point temperature in step 104. Although dew-point temperature is a function of both temperature and humidity, increasing the humidity in the space 20 will typically increase the dew-point temperature. Therefore, if the actual dew-point temperature in space 20 is less than the set point dew-point temperature, this would indicate the need for increased humidification, while an actual dew-point temperature greater than or equal to the set point dew-point temperature would indicate that further humidification is not required.

Therefore, if Act. $T_{dp}$ is less than the S.P. $T_{dp}$ then the controller 42 will cycle the humidification equipment 28, at step 106, to increase the humidity in the space 20, which increases the actual dew-point temperature, and then return to step 102. Conversely, if Act. $T_{dp}$ is greater than or equal to the S.P. $T_{dp}$ then the controller 42 will keep the valve 36 closed so that the humidity is not increased, and the control will then return to step 102. The cycle time of the humidification equipment 28 can be a constant amount that is programmed into the controller 42, or the cycle time can be a variable amount determined by the controller based upon the difference between the actual dew-point temperature and the set point dew-point temperature.

The controller 42 will typically have overall responsibility for comfort management within the space 20, including air conditioning and heating, as well as the humidity control. The controller 42 preferably comprises a microcontroller of any suitable kind which is capable of performing the control algorithm of FIG. 3, and providing control signals for controlling the actuator 40 of the humidification equipment 28. A memory element 56 is preferably associated with the controller 42, either internally or externally thereof, in which is stored suitable data that is to be used for determining the actual dew-point temperature and the set point dew-point temperature.

Dew-point temperature can be determined in a number of different ways. For instance, a psychrometric chart could be suitably stored in the memory element 56, and the humidity and temperature values provided to the controller 42 could then be used to determine the dew-point temperatures. Psychrometric charts and the determination of dew-point temperatures therefrom are conventional. Alternatively, a suitable equation dependent upon humidity and temperature could be stored in the memory element 56 and used to calculate the dew-point temperatures.

The humidity and temperature sensors 48, 50 can either be stand alone sensors within the space 20, or the sensors 48, 50 can be incorporated into a local controller which can be mounted on a wall defining the space 20. For instance, the local controller could be of the type that allows occupant control of environmental conditions, such as temperature and humidity, within the space 20. This type of local controller would thus allow manual control of the temperature set point and/or the humidity set point, which are input to the controller 42. One suitable local controller is the PC 8900 controller, manufactured by Honeywell Inc. of Minneapolis, Minn.

Instead of sensing the humidity and temperature directly within the space 20, the actual dew-point temperature could be determined based upon the humidity and temperature within the return air duct 26. As mentioned previously, while the humidity and temperature within the return air duct 26 may differ from the humidity and temperature in the space 20, the dew-point temperatures will be substantially the same. Thus, as illustrated in dashed lines in FIG. 1, a humidity sensor 58 and a temperature sensor 60 are provided in the return air duct 26 and provide inputs to the controller 42, through which the actual dew-point temperature can be determined. This arrangement permits the invention to be easily adapted to those homes and offices in which the environmental controller is disposed in a location remote from the space to be controlled and which do not have a local controller. Further, the return air duct is readily accessible, thereby facilitating use of this arrangement.

As an alternative, the humidity and temperatures signals from the sensors 58, 60 could be provided to a local controller within the space 20, and then provided to the controller 42.

Figure 4:
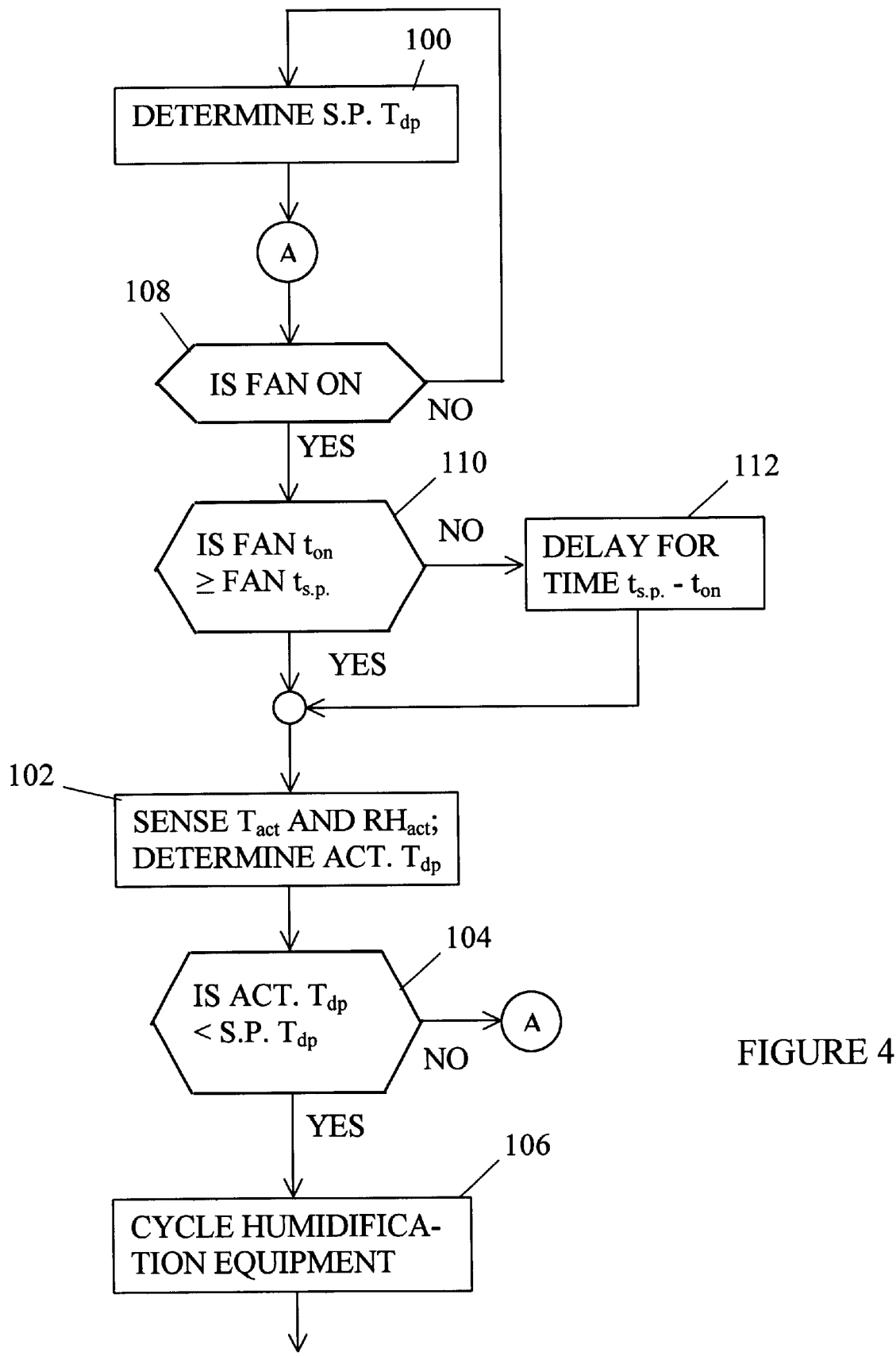
FIG. 4 is a flow diagram similar to FIG. 3, but accounting for the cycling of the fan.

FIG. 4 illustrates an alternate embodiment of humidity control which accounts for the cycling of the fan 24 in the inlet duct 22. When the fan 24 is not operating, air is not being moved through the inlet duct 22 and into the space 20, and the air in the return air duct 26 tends to stop flowing and stagnate. Therefore, during these periods, the temperature within the duct will not be reflective of the temperature in the space 20. During operation of the fan 24, the temperature level within the space 20 and in the return air duct 26 will tend to rise. Eventually, after the first two to four minutes of the fan cycle, the temperature in the return air duct approaches the average temperature in the space.

The control of FIG. 4 accounts for the cycling of the fan 24 by determining at step 108 the status of the fan. If the fan is off, the control returns to step 100, and the temperature and humidity in the space are not sensed, since the air in the return air duct 26 is stagnant. If the fan 24 is on, the control proceeds to step 110 where the control determines whether the fan run time, $t_{on}$, of the current fan cycle is greater than or equal to a predetermined fan run time set point, $t_{s.p.}$. The fan run time set point $t_{s.p.}$ is the approximate time in the fan cycle at which the temperature and humidity in the duct are approximately equal to the temperature and humidity in the space 20. Typically, the conditions in the duct will approach the conditions in the space after two to four minutes of the fan cycle. Thus, the fan must be running for a period of time at least equal to or greater than the fan run time set point, so that the temperature in the duct 26 approaches the temperature in the space 20. The fan run time set point can be determined for each space to be controlled thereby providing precise control, or the fan run time set point can be a standard value which is reflective of the majority of homes and offices.

If $t_{on}$ is not greater than or equal to $t_{s.p.}$, this would indicate that the conditions in the return air duct 26 do not yet equal the conditions in the space 20, and therefore the control proceeds to step 112 where the control is delayed by the difference of $t_{s.p.}-t_{on}$, to allow time for the conditions in the duct 26 to reach the conditions in the space 20. When the delay is complete, the control proceeds to step 102 to sense the temperature and humidity in the duct 26 and determine the dew-point temperature therefrom. This determined dew-point would thus be reflective of the dew-point temperature within the space 20. The control then proceeds to step 104 and step 106 as before. Although this embodiment is described as sensing the temperature and humidity in the duct 26, the temperature and humidity could instead be sensed directly from the space 20.

It is further within the scope of the invention that the temperature and humidity values that are used to determine the actual dew-point temperature could be sensed from any location, as long as the dew-point temperature determined therefrom is reflective of the actual dew-point temperature within the space 20. It is further contemplated that the humidity level in the space 20 could be controlled by dehumidification equipment, rather than or in addition to, humidification equipment, such that the controller 42 would operate the dehumidification equipment when the humidity level in the space needs to be decreased.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of controlling humidity within a space, the space communicating with humidity control equipment having a fan having an operating status and a non-operating status, comprising the steps of:

a) determining a dew-point temperature within the space only during the operating status of the fan;

b) comparing the determined dew-point temperature to a predetermined desired dew-point temperature; and c) controlling the humidity control equipment based upon the difference between the dew-point temperature and the predetermined desired dew-point temperature.

2. The method according to claim 1, further comprising sensing the temperature and humidity during the operating status of the fan.

3. The method according to claim 2, further comprising the step of sensing the temperature and humidity after a predetermined amount of time has elapsed after the start of the fan operating status.

4. The method according to claim 1, wherein the step of determining a dew-point temperature within the space includes sensing temperature and humidity in the space.

5. The method according to claim 1, wherein the step of determining a dew-point temperature within the space includes sensing temperature and humidity in a duct communicating with the space.

6. The method according to claim 5 for use with humidity control equipment whose fan draws air from the space through the duct, including the step of sensing the temperature and humidity within the duct during the operating status of the fan.

7. The method according to claim 1, further including determining a status of a fan which communicates with the space, and further comprising sensing the temperature and humidity based upon the status of the fan.

* * * * *